(12) United States Patent
Su et al.

(10) Patent No.: US 11,496,994 B2
(45) Date of Patent: Nov. 8, 2022

(54) ACKNOWLEDGEMENT INFORMATION SENDING METHOD, ACKNOWLEDGEMENT INFORMATION RECEIVING METHOD, COMMUNICATIONS DEVICE, AND NETWORK DEVICE

(71) Applicant: Huawei Technologies Co., Ltd., Shenzhen (CN)

(72) Inventors: Hongjia Su, Shanghai (CN); Zhengzheng Xiang, Shanghai (CN); Jinfang Zhang, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 17/113,855

(22) Filed: Dec. 7, 2020

(65) Prior Publication Data

US 2021/0092716 A1  Mar. 25, 2021

Related U.S. Application Data

(63) Continuation of application No. PCT/CN2019/087408, filed on May 17, 2019.

(30) Foreign Application Priority Data

Jun. 8, 2018  (CN) .......................... 201810588498.6

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0055* (2013.01); *H04W 28/0278* (2013.01);
(Continued)

(58) Field of Classification Search
CPC ... H04L 1/1607; H04L 1/1861; H04L 1/1867; H04L 5/0055; H04L 5/0091;
(Continued)

(56) References Cited

U.S. PATENT DOCUMENTS 9,137,790 B2 * 9/2015 Chiu ..................... H04L 1/1896
9,515,800 B2 * 12/2016 Lim ....................... H04L 5/0055
(Continued)

FOREIGN PATENT DOCUMENTS

| CN | 104486049 A | 4/2015 |
| CN | 105702018 A | 6/2016 |

(Continued)

OTHER PUBLICATIONS

Cerović et al., Efficient Cooperative HARQ for Multi-Source Multi-Relay Wireless Networks, Oct. 15, 2018, 2018 14th International Conference on Wireless and Mobile Computing, Networking and Communications (WiMob), 2018, pp. 61-68, doi: 10.1109/WiMOB.2018.8589086 (Year: 2018).*

(Continued)

*Primary Examiner* — Eric Nowlin
(74) *Attorney, Agent, or Firm* — Slater Matsil, LLP

(57) ABSTRACT

A first communications device obtains a first resource and a second resource; the first communications device sends first control information and first data to at least one communications device in a group on the first resource, where the first communications device and the at least one communications device in the group belong to a first communications device group, and the first communications device and the at least one communications device in the group each have a group identifier of the first communications device group; and the first communications device receives acknowledgement information from a second communications device on the (Continued)

second resource, where the second communications device is the at least one communications device in the group.

18 Claims, 7 Drawing Sheets

(51) Int. Cl.
  *H04W 28/02* (2009.01)
  *H04W 72/04* (2009.01)
  *H04W 72/12* (2009.01)
(52) U.S. Cl.
  CPC ..... *H04W 72/042* (2013.01); *H04W 72/0446* (2013.01); *H04W 72/0466* (2013.01); *H04W 72/121* (2013.01)
(58) Field of Classification Search
  CPC ......... H04L 5/0094; H04L 2001/0093; H04W 4/40; H04W 28/02; H04W 28/0231; H04W 28/0278; H04W 28/04; H04W 72/02; H04W 72/042; H04W 72/0446; H04W 72/0466; H04W 72/121
  See application file for complete search history.

(56) References Cited

U.S. PATENT DOCUMENTS

| | | | | |
|---|---|---|---|---|
| 9,532,340 | B2* | 12/2016 | Lu | H04W 76/27 |
| 9,602,263 | B2* | 3/2017 | Lee | H04L 1/1854 |
| 10,064,229 | B2* | 8/2018 | Yang | H04L 1/1819 |
| 10,291,364 | B2* | 5/2019 | Wakabayashi | H04W 72/0406 |
| 10,292,193 | B2* | 5/2019 | Qin | H04J 13/0062 |
| 10,624,141 | B2* | 4/2020 | Wu | H04W 72/02 |
| 10,790,941 | B2* | 9/2020 | Zhang | H04W 72/0446 |
| 10,849,037 | B2* | 11/2020 | Feng | H04W 76/23 |
| 10,869,318 | B2* | 12/2020 | Feng | H04W 4/44 |
| 11,088,808 | B2* | 8/2021 | Hong | H04L 5/0007 |
| 11,115,789 | B2* | 9/2021 | Kim | H04W 28/26 |
| 11,140,697 | B2* | 10/2021 | Hu | H04B 7/0626 |
| 11,218,216 | B2* | 1/2022 | Uchiyama | H04W 72/02 |
| 11,323,213 | B2* | 5/2022 | Li | H04W 72/042 |
| 11,388,026 | B2* | 7/2022 | Yu | H04W 8/005 |
| 2009/0003378 | A1* | 1/2009 | Sachs | H04L 1/1887 |
| | | | | 370/466 |
| 2012/0300662 | A1* | 11/2012 | Wang | H04W 72/0406 |
| | | | | 370/252 |
| 2013/0223318 | A1* | 8/2013 | Liu | H04L 1/1812 |
| | | | | 370/312 |
| 2014/0010175 | A1* | 1/2014 | Chiu | H04W 72/042 |
| | | | | 370/329 |
| 2014/0376489 | A1* | 12/2014 | Lee | H04W 72/0446 |
| | | | | 370/329 |
| 2015/0023267 | A1* | 1/2015 | Lim | H04W 72/0406 |
| | | | | 370/329 |
| 2015/0063247 | A1* | 3/2015 | Lee | H04L 1/1887 |
| | | | | 370/329 |
| 2015/0110038 | A1* | 4/2015 | Yang | H04L 5/0007 |
| | | | | 370/329 |
| 2015/0319746 | A1* | 11/2015 | Lu | H04L 1/1896 |
| | | | | 370/280 |
| 2016/0021566 | A1* | 1/2016 | Kimura | H04W 28/06 |
| | | | | 370/329 |
| 2017/0215183 | A1* | 7/2017 | Gulati | H04W 72/0426 |
| 2017/0310427 | A1* | 10/2017 | Wakabayashi | H04L 1/1887 |
| 2017/0331594 | A1* | 11/2017 | Wen | H04L 5/0055 |
| 2017/0347394 | A1* | 11/2017 | Yasukawa | H04L 1/189 |
| 2018/0070400 | A1* | 3/2018 | Wu | H04W 72/0406 |
| 2018/0091265 | A1* | 3/2018 | Liu | H04L 1/08 |
| 2018/0213379 | A1* | 7/2018 | Xiong | H04W 4/70 |
| 2019/0037442 | A1* | 1/2019 | Yi | H04L 5/0048 |
| 2019/0037463 | A1* | 1/2019 | Feng | H04W 76/14 |
| 2019/0058986 | A1* | 2/2019 | Loehr | H04L 1/1825 |
| 2019/0182840 | A1* | 6/2019 | Feng | H04W 4/44 |
| 2019/0199483 | A1* | 6/2019 | Zhang | H04L 1/1896 |
| 2019/0229853 | A1* | 7/2019 | Lee | H04L 1/0026 |
| 2020/0007297 | A1* | 1/2020 | Hong | H04W 28/04 |
| 2020/0059766 | A1* | 2/2020 | Kim | H04L 5/0055 |
| 2020/0178216 | A1* | 6/2020 | Huang | H04W 72/0473 |
| 2020/0195389 | A1* | 6/2020 | Basu Mallick | H04L 1/1887 |
| 2020/0236666 | A1* | 7/2020 | Yu | H04W 72/0446 |
| 2020/0267025 | A1* | 8/2020 | Yu | H04W 88/04 |
| 2020/0305176 | A1* | 9/2020 | Hu | H04B 7/0456 |
| 2020/0412485 | A1* | 12/2020 | Wang | H04L 5/0055 |
| 2021/0105066 | A1* | 4/2021 | Uchiyama | H04B 7/2606 |
| 2021/0235471 | A1* | 7/2021 | Osawa | H04W 72/1289 |
| 2021/0377927 | A1* | 12/2021 | Kusashima | H04W 72/042 |

FOREIGN PATENT DOCUMENTS

| | | | | | |
|---|---|---|---|---|---|
| CN | 106485947 | A | | 3/2017 | |
| CN | 107645774 | A | | 1/2018 | |
| CN | 107733574 | A | | 2/2018 | |
| CN | 111034075 | A | * | 4/2020 | ......... H04L 1/0003 |
| CN | 111279768 | A | * | 6/2020 | ......... H04L 1/1614 |
| CN | 111034075 | B | * | 11/2021 | ......... H04L 1/0003 |
| EP | 3051733 | A1 | * | 8/2016 | ......... H04L 1/1877 |
| EP | 3213440 | A1 | * | 9/2017 | ......... H04L 1/1825 |
| EP | 3051733 | B1 | * | 11/2018 | ......... H04L 1/1877 |
| EP | 3213440 | B1 | * | 2/2019 | ......... H04L 1/1825 |
| EP | 3503635 | A1 | | 6/2019 | ........ H04L 27/2607 |
| WO | WO-2016078905 | A1 | * | 5/2016 | ......... H04L 1/1825 |
| WO | 2016197622 | A1 | | 12/2016 | |
| WO | WO-2019028905 | A1 | * | 2/2019 | ......... H04L 1/0003 |

OTHER PUBLICATIONS

Mediatek Inc., "ACK/NACK feedback design and reliability for NR URLLC", 3GPP TSG RAN WG1 Meeting #93, R1-1806812, Busan, Korea, May 21-25, 2018, 4 pages.

\* cited by examiner

ACKNOWLEDGEMENT INFORMATION SENDING METHOD, ACKNOWLEDGEMENT INFORMATION RECEIVING METHOD, COMMUNICATIONS DEVICE, AND NETWORK DEVICE

CROSS-REFERENCE TO RELATED APPLICATIONS

This application is a continuation of International Application No. PCT/CN2019/087408, filed on May 17, 2019, which claims priority to Chinese Patent Application No. 201810588498.6, filed on Jun. 8, 2018. The disclosures of the aforementioned applications are hereby incorporated by reference in their entireties.

TECHNICAL FIELD

Embodiments of this application relate to a communications system, and in particular, to an acknowledgement information sending method, an acknowledgement information receiving method, a communications device, and a network device.

BACKGROUND

Device-to-device (D2D) communication, vehicle-to-vehicle (V2V) communication, vehicle-to-pedestrian V2P (V2P) communication, or vehicle-to-infrastructure/network V2I/N (V2I/N) communication is a technology for direct communication between terminal devices. V2V, V2P, and V2I/N are collectively referred to as V2X. In other words, a vehicle communicates with anything.

The V2X communication is used as an example. A first terminal device periodically sends some information of the first terminal device, for example, information such as location information, speed information, and intention information, to a plurality of other terminal devices through groupcast or broadcast, to improve driving safety of a vehicle. In the prior art, the first terminal device cannot learn whether the plurality of other terminal devices correctly receive the foregoing information sent by the first terminal device, and cannot meet a reliability requirement of the V2X communication.

SUMMARY

Embodiments of this application provide an acknowledgement information sending method, an acknowledgement information receiving method, a communications device, a network device, and a system, to improve reliability of V2X communication.

According to a first aspect, an acknowledgement information receiving method is provided. The method includes: A first communications device obtains a first resource and a second resource; the first communications device sends first control information and first data to at least one communications device in a group on the first resource, where the first communications device and the at least one communications device in the group belong to a first communications device group, the first communications device and the at least one communications device in the group each have a group identifier of the first communications device group, and the first control information is used to indicate a resource that is used to send the first data on the first resource, the second resource, and the group identifier of the first communications device group; and the first communications device receives acknowledgement information from a second communications device on the second resource, where the acknowledgement information is used to feed back whether the second communications device correctly receives the first data, and the second communications device is the at least one communications device in the group.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the first communications device receives first downlink control information from a network device, where the first downlink control information is used to indicate the first resource and the second resource, and the first downlink control information is scrambled by using the group identifier of the first communications device group; and that the first communications device obtains the first resource and the second resource includes: the first communications device obtains the first resource and the second resource by descrambling the first downlink control information. Downlink control information is scrambled by using the group identifier, so that only a communications device that belongs to the first communications device group can descramble the downlink control information to obtain the downlink control information.

In a possible design, before the first communications device receives the first downlink control information from the network device, the method further includes: The first communications device sends a scheduling request to the network device on a third resource, where there is a correspondence between the third resource and the first communications device group, and the scheduling request is used to request the network device to schedule the first resource and the second resource; and the group identifier of the first communications device group used to scramble the first downlink control information is obtained by the network device based on the correspondence.

In a possible design, the first communications device sends a buffer status report and a scheduling request to the network device, where the buffer status report includes the group identifier of the first communications device group to which the first communications device belongs, the buffer status report is used to request the network device to schedule the second resource, and the scheduling request is used to request the network device to schedule the first resource.

In a possible design, that the first communications device obtains the first resource and the second resource includes: the first communications device selects the first resource and the second resource from a resource pool.

In a possible design, the method further includes: The first communications device sends the first control information and the first data to at least one communications device outside a group on the first resource, where the at least one communications device outside the group does not belong to the first communications device group, and the at least one communications device outside the group does not have the group identifier of the first communications device group. Therefore, the communications device outside the group may also receive the first data from the first communications device based on the first control information, so that reliability of a communications device outside the first communications device group can be improved.

In a possible design, the first control information is further used to indicate that the first resource and the second resource are separated by k slots, and when the first resource belongs to a slot n, the second resource belongs to a slot n+k or a slot n+k−1, where n is an integer, and k is a positive integer.

According to a second aspect, a first communications device is provided. The first communications device includes: a processing unit, configured to obtain a first resource and a second resource; a sending unit, configured to send first control information and first data to at least one communications device in a group on the first resource, where the first communications device and the at least one communications device in the group belong to a first communications device group, the first communications device and the at least one communications device in the group each have a group identifier of the first communications device group, and the first control information is used to indicate a resource that is used to send the first data on the first resource, the second resource, and the group identifier of the first communications device group; and a receiving unit, configured to receive acknowledgement information from a second communications device on the second resource, where the acknowledgement information is used to feed back whether the second communications device correctly receives the first data, and the second communications device is the at least one communications device in the group.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the receiving unit is further configured to receive first downlink control information from a network device, where the first downlink control information is used to indicate the first resource and the second resource, and the first downlink control information is scrambled by using the group identifier of the first communications device group; and that the processing unit is configured to obtain the first resource and the second resource includes: the processing unit is configured to obtain the first resource and the second resource by descrambling the first downlink control information. Downlink control information is scrambled by using the group identifier, so that only a communications device that belongs to the first communications device group can descramble the downlink control information to obtain the downlink control information.

In a possible design, before the receiving unit receives the first downlink control information from the network device, the sending unit is configured to send a scheduling request to the network device on a third resource, where there is a correspondence between the third resource and the first communications device group, and the scheduling request is used to request the network device to schedule the first resource and the second resource; and the group identifier of the first communications device group used to scramble the first downlink control information is obtained by the network device based on the correspondence.

In a possible design, the sending unit is configured to send a buffer status report and a scheduling request to the network device, where the buffer status report includes the group identifier of the first communications device group to which the first communications device belongs, the buffer status report is used to request the network device to schedule the second resource, and the scheduling request is used to request the network device to schedule the first resource.

In a possible design, that the processing unit is configured to obtain the first resource and the second resource includes: the processing unit is configured to select the first resource and the second resource from a resource pool.

In a possible design, the sending unit is further configured to send the first control information and the first data to at least one communications device outside a group on the first resource, where the at least one communications device outside the group does not belong to the first communications device group, and the at least one communications device outside the group does not have the group identifier of the first communications device group. Therefore, the communications device outside the group may also receive the first data from the first communications device based on the first control information, so that reliability of a communications device outside the first communications device group can be improved.

In a possible design, the first control information is further used to indicate that the first resource and the second resource are separated by k slots, and when the first resource belongs to a slot n, the second resource belongs to a slot n+k or a slot n+k−1, where n is an integer, and k is a positive integer.

According to a third aspect, an acknowledgement information sending method is provided. The method includes: A second communications device receives first control information and first data from a first communications device on a first resource, where the second communications device is at least one communications device in a group, the first communications device and the at least one communications device in the group belong to a first communications device group, the first communications device and the second communications device each have a group identifier of the first communications device group, and the first control information is used to indicate a resource that is used to send the first data on the first resource, a second resource, and the group identifier of the first communications device group; and the second communications device sends acknowledgement information to the first communications device on the second resource, where the acknowledgement information is used to feed back whether the second communications device correctly receives the first data.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the method further includes: The second communications device receives first downlink control information from a network device, where the first downlink control information is used to indicate the first resource and the second resource, and the first downlink control information is scrambled by using the group identifier of the first communications device group; and the second communications device obtains the first resource and the second resource by descrambling the first downlink control information.

According to a fourth aspect, a second communications device is provided. The second communications device includes: a receiving unit, configured to receive first control information and first data from a first communications device on a first resource, where the second communications device is at least one communications device in a group, the first communications device and the at least one communications device in the group belong to a first communications device group, the first communications device and the second communications device each have a group identifier of the first communications device group, and the first control information is used to indicate a resource that is used to send the first data on the first resource, a second resource, and the group identifier of the first communications device group; and a sending unit, configured to send acknowledgement information to the first communications device on the second resource, where the acknowledgement information is used to feed back whether the second communications device correctly receives the first data.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the receiving unit is further configured to receive first downlink control information from a network device, where the first downlink control information is used to indicate the first resource and the second resource, and the first downlink control information is scrambled by using the group identifier of the first communications device group; and the second communications device further includes a processing unit, where the processing unit is configured to obtain the first resource and the second resource by descrambling the first downlink control information.

According to a fifth aspect, a downlink control information sending method is provided. The method includes: A network device receives a scheduling request from a first communications device on a third resource, where there is a correspondence between the third resource and the first communications device, the scheduling request is used to request the network device to schedule a first resource used to transmit first control information and first data and a second resource used to transmit acknowledgement information, the first resource is used by the first communications device to send the first control information and the first data to at least one communications device in a group, the second resource is used by a second communications device to send the acknowledgement information to the first communications device, the acknowledgement information is used to feed back whether the second communications device correctly receives the first data, the second communications device is the at least one communications device in the group, the first communications device and the at least one communications device in the group belong to a first communications device group, and the first communications device and the at least one communications device in the group each have a group identifier of the first communications device group; the network device obtains, based on the third resource and the correspondence, the group identifier of the first communications device group to which the first communications device belongs; and the network device sends downlink control information to the first communications device and the at least one communications device in the group, where the first downlink control information is used to indicate the first resource and the second resource, and the first downlink control information is scrambled by using the group identifier of the first communications device group.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the first control information is further used to indicate that the first resource and the second resource are separated by k slots, and when the first resource belongs to a slot n, the second resource belongs to a slot n+k or a slot n+k−1, where n is an integer, and k is a positive integer.

According to a sixth aspect, a network device is provided. The network device includes: a receiving unit, configured to receive a scheduling request from a first communications device on a third resource, where there is a correspondence between the third resource and the first communications device, the scheduling request is used to request the network device to schedule a first resource used to transmit first control information and first data and a second resource used to transmit acknowledgement information, the first resource is used by the first communications device to send the first control information and the first data to at least one communications device in a group, the second resource is used by a second communications device to send the acknowledgement information to the first communications device, the acknowledgement information is used to feed back whether the second communications device correctly receives the first data, the second communications device is the at least one communications device in the group, the first communications device and the at least one communications device in the group belong to a first communications device group, and the first communications device and the at least one communications device in the group each have a group identifier of the first communications device group; a processing unit, configured to obtain, based on the third resource and the correspondence, the group identifier of the first communications device group to which the first communications device belongs; and a sending unit, configured to send downlink control information to the first communications device and the at least one communications device in the group, where the first downlink control information is used to indicate the first resource and the second resource, and the first downlink control information is scrambled by using the group identifier of the first communications device group.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the first control information is further used to indicate that the first resource and the second resource are separated by k slots, and when the first resource belongs to a slot n, the second resource belongs to a slot n+k or a slot n+k−1, where n is an integer, and k is a positive integer.

According to a seventh aspect, a downlink control information sending method is provided. The method includes: A network device receives a buffer status report and a scheduling request from a first communications device, where the buffer status report includes a group identifier of a first communications device group to which the first communications device belongs, the buffer status report is used to request the network device to schedule a second resource used to transmit acknowledgement information, the scheduling request is used to request the network device to schedule a first resource used to transmit first control information and first data, the first resource is used by the first communications device to send the first control information and the first data to at least one communications device in a group, the second resource is used by a second communications device to send the acknowledgement information to the first communications device, the acknowledgement information is used to feed back whether the second communications device correctly receives the first data, the second communications device is the at least one communications device in the group, the first communications device and the at least one communications device in the group belong to the first communications device group, and the first communications device and the at least one communications device in the group each have the group identifier of the first communications device group; and the network device sends downlink control information to the first communications device and the at least one communications device in the group, where the first downlink control information is used to indicate the first resource and the second resource, and the first downlink control information is scrambled by using the group identifier of the first communications device group.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the first control information is further used to indicate that the first resource and the second resource are separated by k slots, and when the first resource belongs to a slot n, the second resource belongs to a slot n+k or a slot n+k−1, where n is an integer, and k is a positive integer.

According to an eighth aspect, a network device is provided. The network device includes: a receiving unit, configured to receive a buffer status report and a scheduling request from a first communications device, where the buffer status report includes a group identifier of a first communications device group to which the first communications device belongs, the buffer status report is used to request the network device to schedule a second resource used to transmit acknowledgement information, the scheduling request is used to request the network device to schedule a first resource used to transmit first control information and first data, the first resource is used by the first communications device to send the first control information and the first data to at least one communications device in a group, the second resource is used by a second communications device to send the acknowledgement information to the first communications device, the acknowledgement information is used to feed back whether the second communications device correctly receives the first data, the second communications device is the at least one communications device in the group, the first communications device and the at least one communications device in the group belong to the first communications device group, and the first communications device and the at least one communications device in the group each have the group identifier of the first communications device group; and a sending unit, configured to send downlink control information to the first communications device and the at least one communications device in the group, where the first downlink control information is used to indicate the first resource and the second resource, and the first downlink control information is scrambled by using the group identifier of the first communications device group.

According to this embodiment of this application, the first communications device obtains the first resource and the second resource, sends the first control information and the first data to the second communications device on the first resource, and receives the acknowledgement information from the second communications device on the second resource. Therefore, reliability of V2X communication is improved.

In a possible design, the first control information is further used to indicate that the first resource and the second resource are separated by k slots, and when the first resource belongs to a slot n, the second resource belongs to a slot n+k or a slot n+k−1, where n is an integer, and k is a positive integer.

According to a ninth aspect, an embodiment of this application provides a computer-readable storage medium. The computer-readable storage medium stores an instruction, and when the instruction is run on a computer, the computer is enabled to perform the methods according to the foregoing aspects.

According to a tenth aspect, an embodiment of this application provides a computer program product. The program product stores a computer software instruction used by the first communications device or the second communications device, and the computer software instruction includes a program used to perform the solutions according to the foregoing aspects.

According to an eleventh aspect, an embodiment of this application provides a chip, configured to perform the methods according to the foregoing aspects. The chip may include a part having functions of a memory, a processor, a transmitter, a receiver, and/or a transceiver, and the memory stores an instruction, code, and/or data, to perform the methods according to the foregoing aspects.

According to a twelfth aspect, an embodiment of this application provides a system. The system includes the first communications device and the second communications device according to the foregoing aspects.

DETAILED DESCRIPTION OF ILLUSTRATIVE EMBODIMENTS

Figure 1:
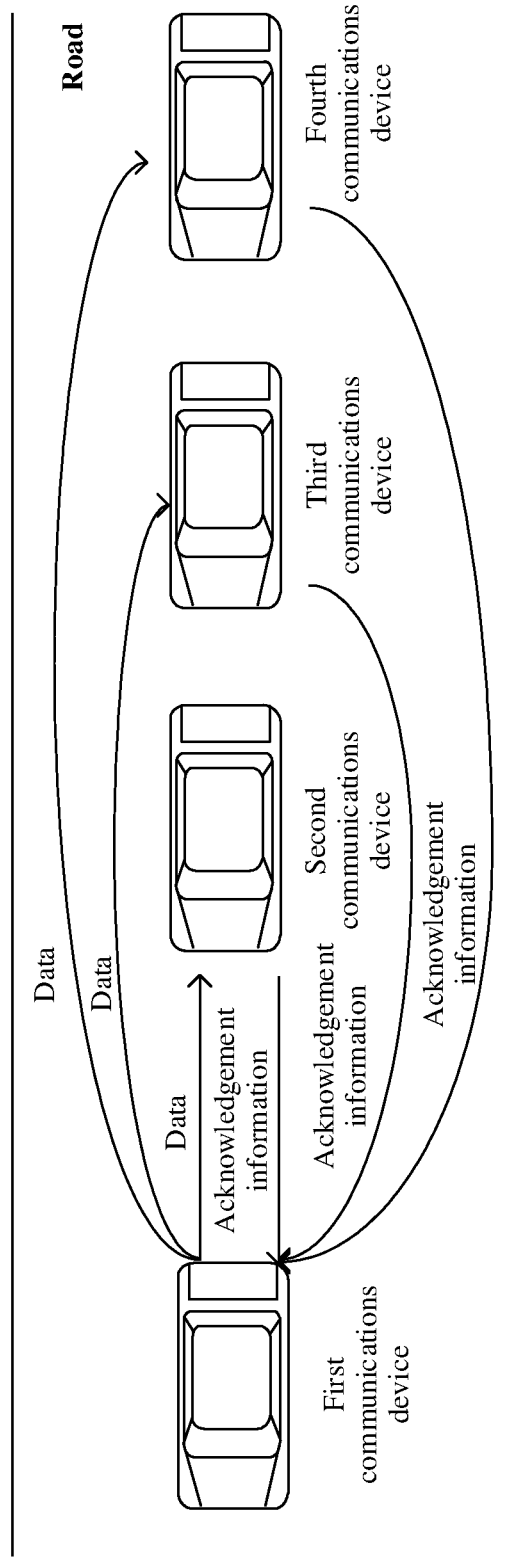
FIG. 1 is a schematic architectural diagram of a system according to an embodiment of this application.

For example, V2X communication information is groupcast or broadcast. In FIG. 1, a first communications device sends data to one or more other communications devices. The data may be information such as location information, speed information, and intention information of the first communications device. The intention information may be turning information, lane changing information, U-turn information, acceleration information, or braking information, or may be audio information or video information. The plurality of other communications devices and the first communications device form a communications device group may include. For example, in a case of platooning scenario, a number of vehicles form a vehicle platoon, and travel in a unit of platooning. In FIG. 1, the first communications device may be the first vehicle. For example, the plurality of other communications devices may include second to fourth communications devices, and the second to fourth communications devices and the first communications device belong to a same communications device group. Therefore, the second to fourth communications devices may be referred to as communications devices in a group, and the first to fourth communications devices form a vehicle platoon in traveling. After the second to fourth communications devices receive the data, if the second communications device, the third communications device, or the fourth communications device correctly receives the data, acknowledgement (ACK) information is sent to the first communications device. In this case, the first communications device no longer sends the data to the second communications device, the third communications device, or the fourth communications device. If the second communications device, the third communications device, or fourth communications device does not correctly receive the data, negative acknowledgement (NACK) information is sent to the first communications device. In this case, the first communications device sends the data to the second communications device, the third communications device, or the fourth communications device again, and the second communications device, the third communications device, or the fourth communications device can receive the data again, thereby improving reliability of transmission of groupcast data or broadcast data. Certainly, the plurality of other communications devices may further include more communications devices, and these communications devices do not belong to the communications device group including the first to fourth communications devices. In other words, these communications devices are communications devices outside a group. For example, a fifth communications device is a communications device outside a group. The first communications device can also broadcast data to the fifth communications device. A resource used by the first communications device to perform V2X communication with the second to fourth communications devices may be allocated by a network device in mode 3 V2X communication, and may be independently selected by the first communications device in mode 4 V2X communication.

The network device in this application is an apparatus that is deployed in a radio access network and that is configured to provide a wireless communication function for the first to fifth communications devices. The network device may be a base station (BS), for example, a macro base station, a micro base station, a relay station, or an access point, or may be a device in another form, for example, a street lamp or a road side unit (RSU). In systems using different radio access technologies, a device having a network device function may be termed differently. For example, in a 5th generation 5G network, the device is a network device or a base station; in a long term evolution (LTE) network, the device is referred to as an evolved NodeB (eNB or eNodeB for short); in a third generation 3G network, the device is referred to as a node B (Node B); or the like. Or the device is a road side unit (RSU) in V2X communication, or a chip or a system on chip (SOC) in the network device or base station. For ease of description, in this application, the foregoing apparatus that provides the wireless communication function for the first to fifth communications devices is collectively referred to as the network device.

The first to fifth communications devices in this application may include various devices having a wireless communication function or units, components, apparatuses, chips, or SOCs in the devices. The device having a wireless communication function may be, for example, a vehicle-mounted device, a wearable device, a computing device, or another device connected to a wireless modem, a mobile station (MS), a terminal, or user equipment (UE).

With reference to specific examples, the following describes the embodiments of this application in more detail by using the first to fifth communications devices and the network device as an example.

Figure 2:
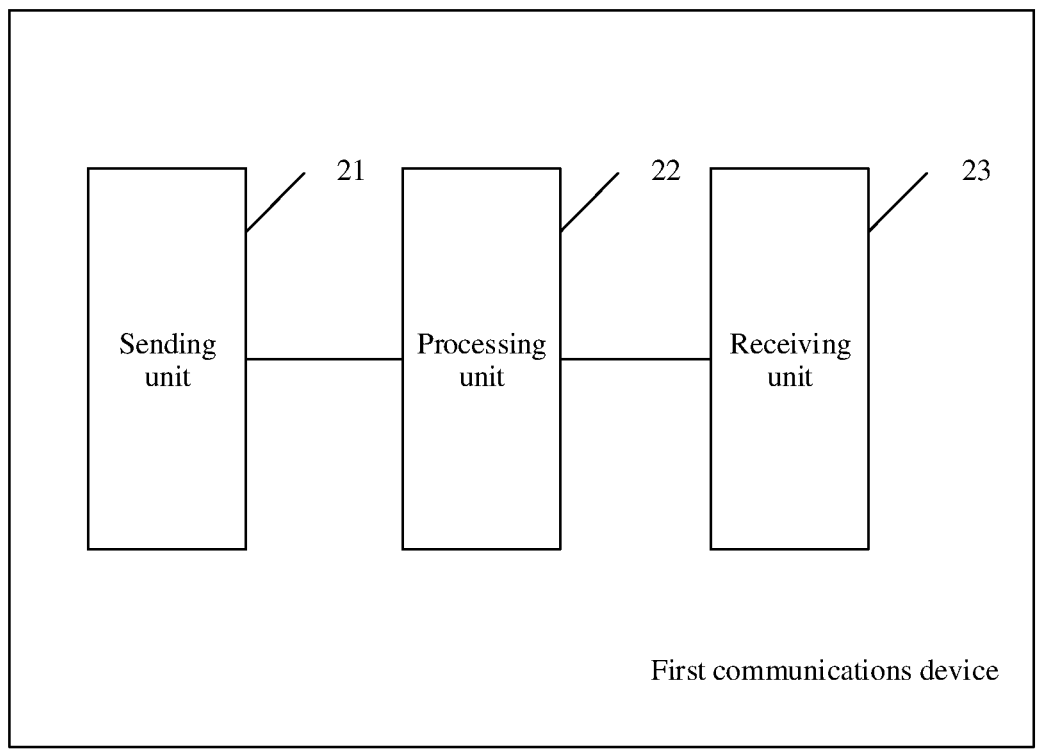
FIG. 2 shows a first communications device according to an embodiment of this application.
Figure 3:
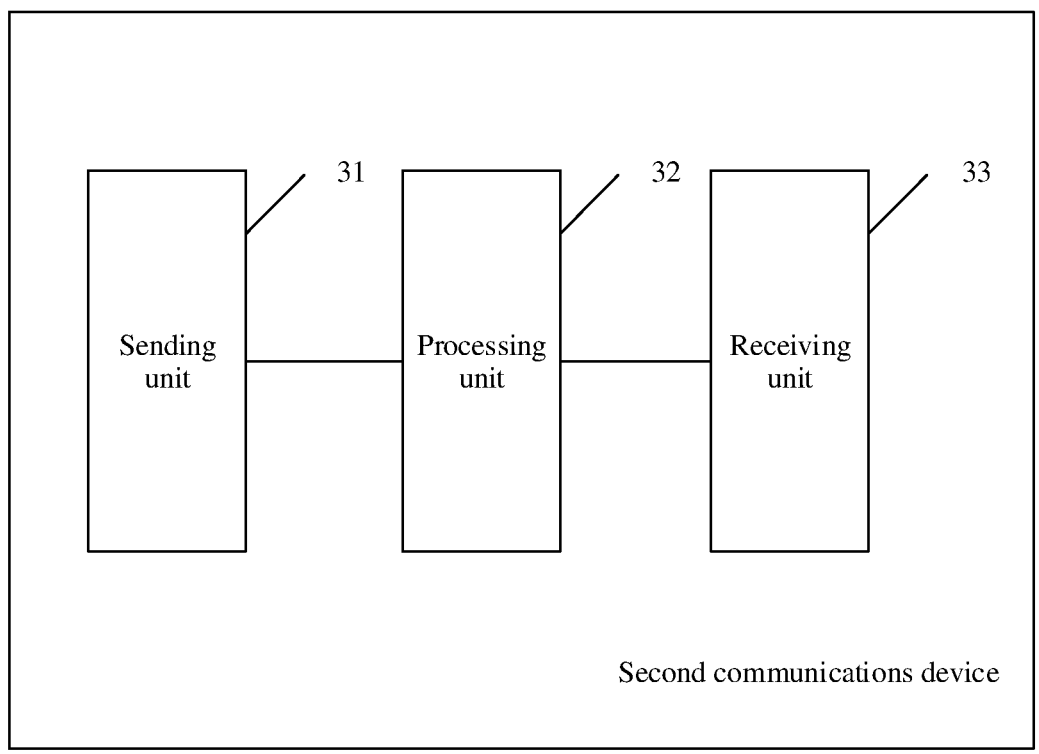
FIG. 3 shows a second communications device according to an embodiment of this application.
Figure 4:
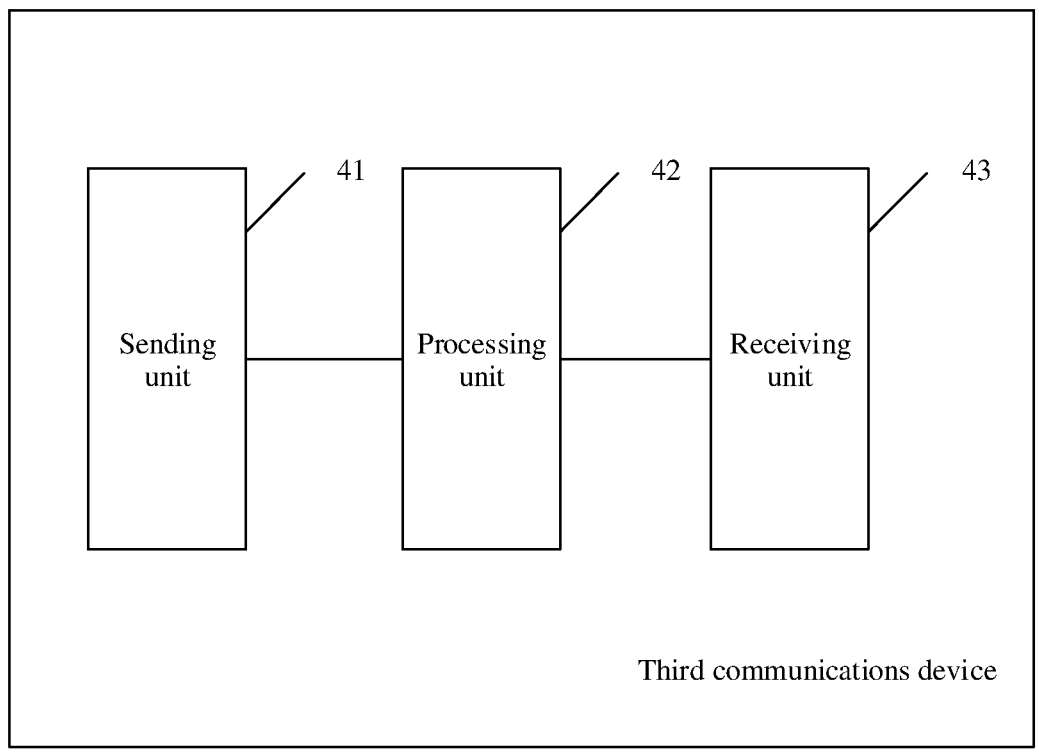
FIG. 4 shows a third communications device according to an embodiment of this application.
Figure 5:
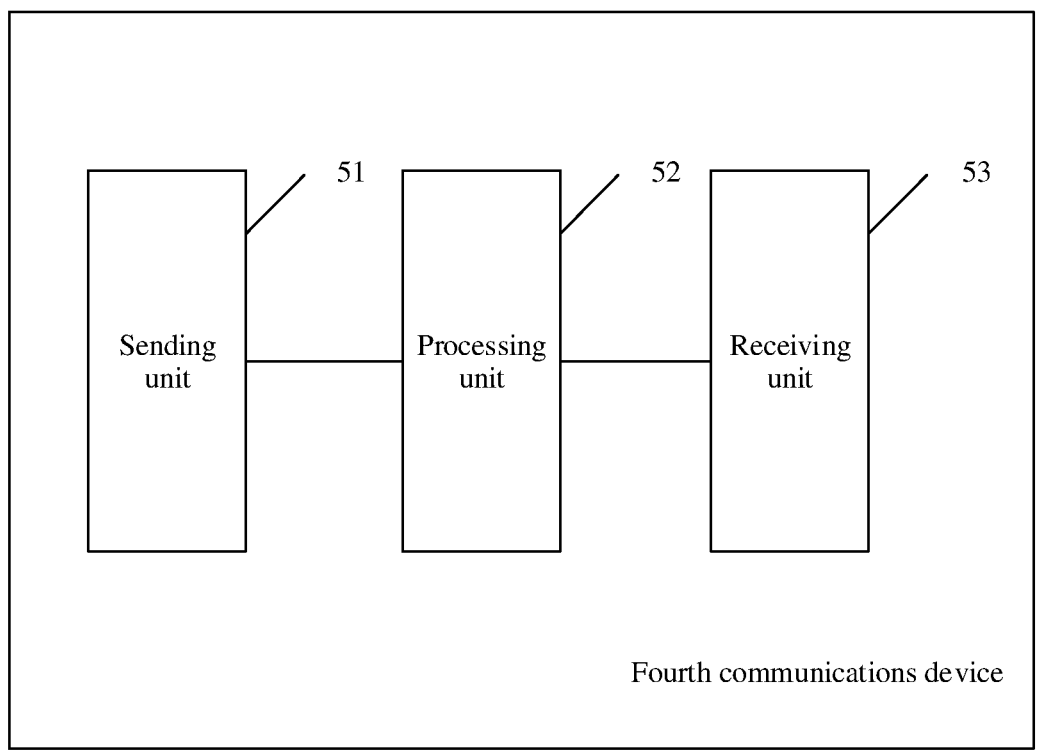
FIG. 5 shows a fourth communications device according to an embodiment of this application.
Figure 6:
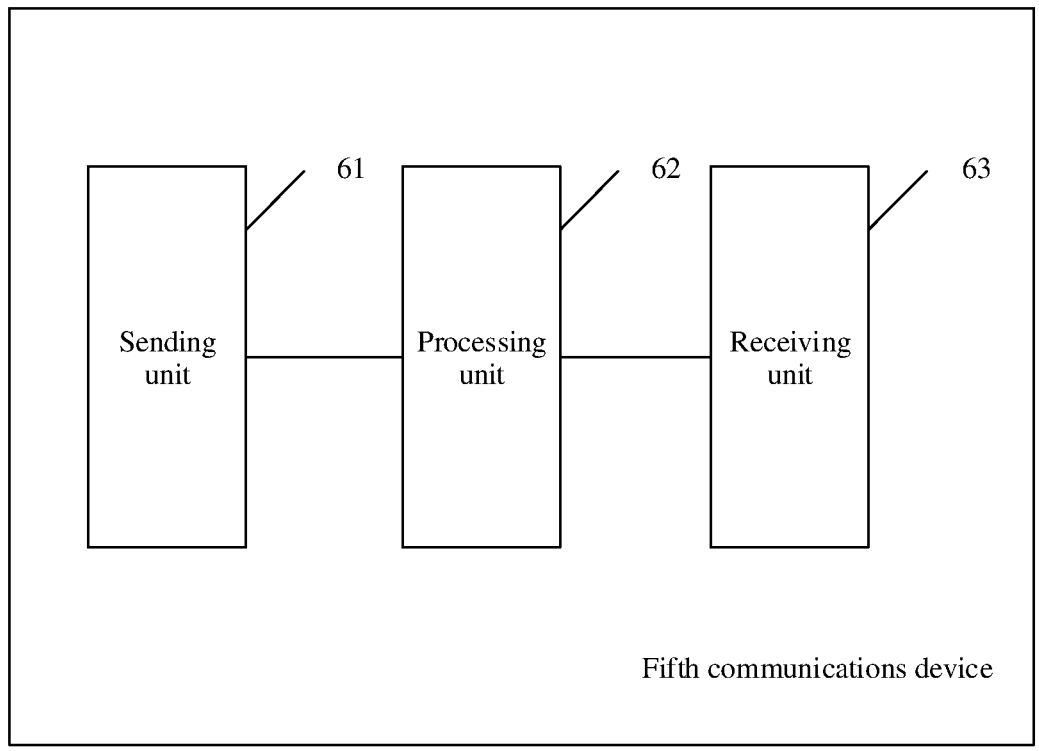
FIG. 6 shows a fifth communications device according to an embodiment of this application.
Figure 7:
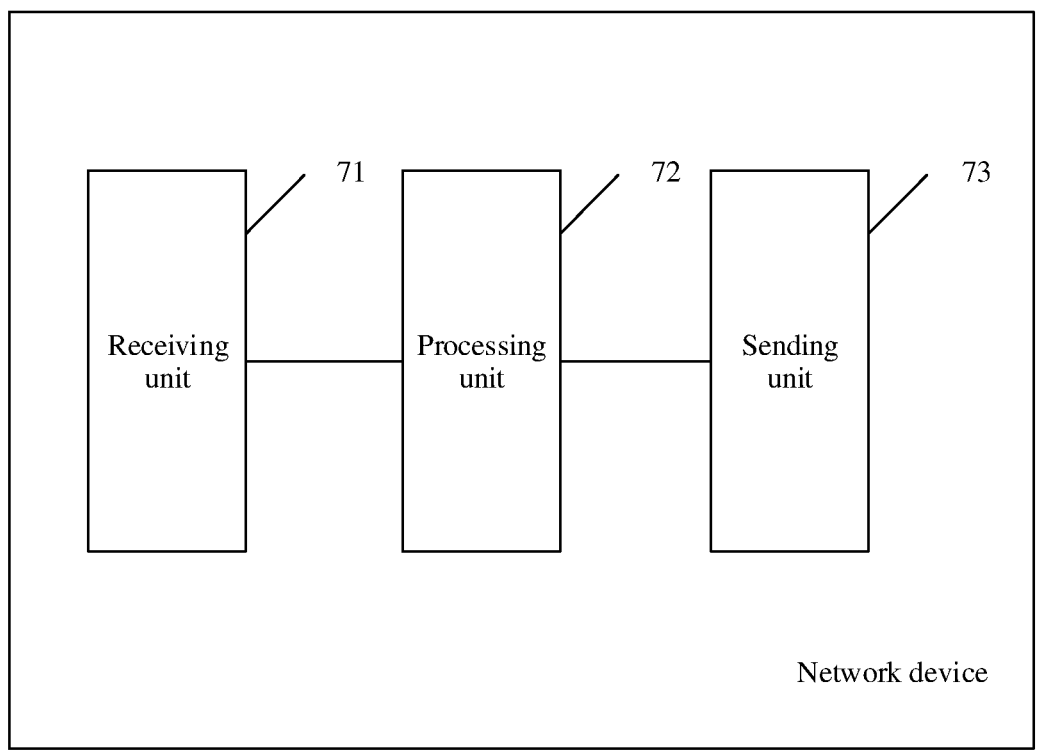
FIG. 7 shows a network device according to an embodiment of this application.
Figure 8:
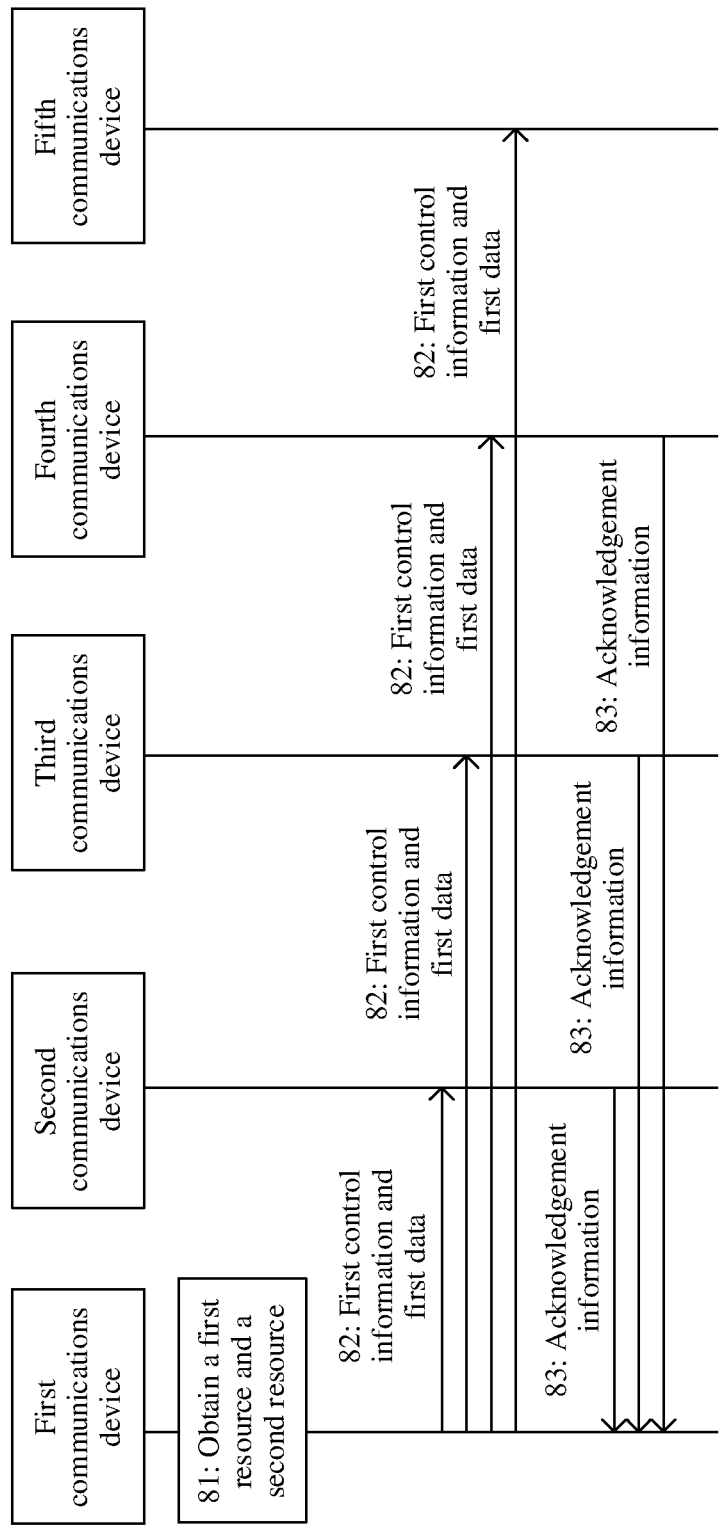
FIG. 8 is a schematic diagram of an acknowledgement information transmission method according to an embodiment of this application.
Figure 11:
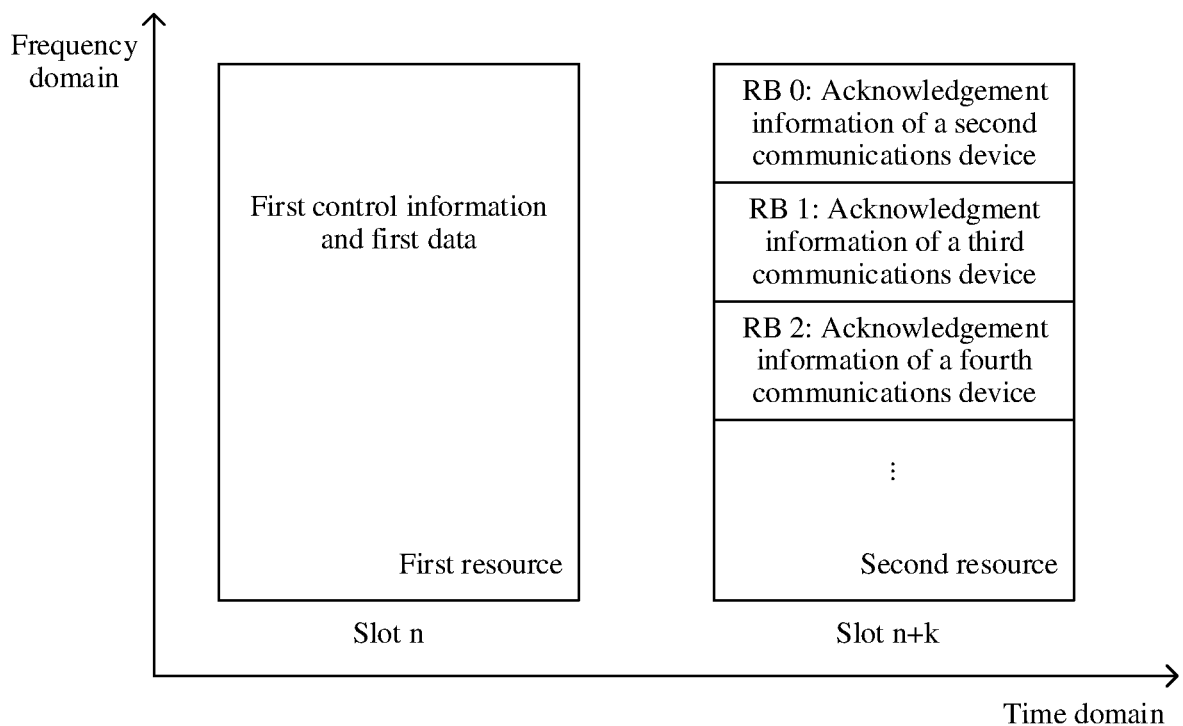
FIG. 11 is a schematic diagram of an acknowledgement information transmission resource according to an embodiment of this application.

FIG. 8 shows an acknowledgement information transmission method, first to fifth communications devices, a network device, and a system according to an embodiment of this application. As shown in FIG. 2, the first communications device includes a sending unit 21, a processing unit 22, and a receiving unit 23. The sending unit 21 and the receiving unit 23 may be replaced with a transceiver unit. As shown in FIG. 3, the second communications device includes a sending unit 31, a processing unit 32, and a receiving unit 33. The sending unit 31 and the receiving unit 33 may be replaced with a transceiver unit. As shown in FIG. 4, the third communications device includes a sending unit 41, a processing unit 42, and a receiving unit 43. The sending unit 41 and the receiving unit 43 may be replaced with a transceiver unit. As shown in FIG. 11, the fourth communications device includes a sending unit 51, a processing unit 52, and a receiving unit 53. The sending unit 51 and the receiving unit 53 may be replaced with a transceiver unit. As shown in FIG. 6, the fifth communications device includes a sending unit 61, a processing unit 62, and a receiving unit 63. The sending unit 61 and the receiving unit 63 may be replaced with a transceiver unit. As shown in FIG. 7, the network device includes a sending unit 71, a processing unit 72, and a receiving unit 73. The sending unit 71 and the receiving unit 73 may be replaced with a transceiver unit.

When the first to fifth communications devices are terminal devices or user equipment, and when the network device is a base station, the processing unit 22 to the processing unit 72 may be processors, the sending unit 21 to the sending unit 71 and the receiving unit 23 to the receiving unit 73 may be transceivers, the sending unit 21 to the sending unit 71 may be transmitters, and the receiving unit 23 to the receiving unit 73 may be receivers. The transceiver, the transmitter, or the receiver may be a radio frequency circuit. When each of the first to fifth communications devices or the network device includes a storage unit, the storage unit is configured to store a computer instruction. The processor is communicatively connected to the memory, and the processor executes the computer instruction stored in the memory, to enable the first to fifth communications devices or the network device to perform the method in the embodiment of FIG. 2. The processor may be a general-purpose central processing unit (CPU), a microprocessor, or an application-specific integrated circuit (ASIC).

When each of the first to fifth communications devices or the network device is a chip, the processing unit 22 to the processing unit 72 may be, for example, processors, the sending unit 21 to the sending unit 71 may be output interfaces, pins, circuits, or the like, the receiving unit 23 to the receiving unit 73 may be input interfaces, pins, circuits, or the like, and the transceiver unit may be, for example, an input/output interface, a pin, or a circuit. The processing unit may execute a computer-executable instruction stored in a storage unit, so that a chip in each of the first to fifth communications devices or in the network device performs the methods in FIG. 8 to FIG. 10. Optionally, the storage unit is a storage unit in the chip, for example, a register or a buffer, or the storage unit may be a storage unit in the terminal but outside the chip, for example, a read-only memory (ROM), another type of static storage device capable of storing static information and instructions, or a random access memory (RAM).

Steps of the acknowledgement information sending method and the acknowledgement information receiving method in the embodiment of FIG. 8 include the following.

Step 81: The first communications device obtains a first resource and a second resource. The first communications device and at least one communications device in a group jointly form a first communications device group. For example, in FIG. 8, the second to fourth communications devices are the at least one communications device in the group, the first to fourth communications devices form the first communications device group, and vehicles to which the first to fourth communications devices belong form a vehicle platoon, and a vehicle to which the first communications device belongs is the first vehicle in the vehicle platoon. The fifth communications device in FIG. 8 does not belong to the first communications device group, and a vehicle to which the fifth communications device belongs is not in the vehicle platoon. In this embodiment of this application, the fifth communications device is referred to as a communications device outside the group. The first resource is used by the first communications device to send first control information and first data to the second to fifth communications device, the first control information is sidelink control information, and the first data is sidelink data. The second resource is used by the second to fourth communications devices to transmit acknowledgement information to the first communications device. Certainly, the second resource may be further used by the second to fourth communications devices to transmit channel state information (CSI) to the first communications device, and the second resource may also be used by the second to fourth communications devices to transmit the acknowledgement information and the CSI to the first communications device.

The first communications device group may be independently established by the first communications device. For example, the first communications device establishes the first to fourth communications devices as the first communications device group, selects one group identifier from a preset group identifier range as a group identifier of the first communications device group, and sends the group identifier to the network device for confirmation. Alternatively, the first communications device group may be established by the network device. For example, the network device may establish the first to fourth communications devices as the first communications device group, and allocate a group identifier to the first communications device group. The group identifier may be sent by the network device to the second to fourth communications devices, or may be sent by the first communications device to the second to fourth communications devices. The group identifier may be, for example, a group V2X radio network temporary identifier (G-V2X-RNTI). After the communications device group is established, communications devices in the group each have the group identifier of the communications device group.

Figure 9:
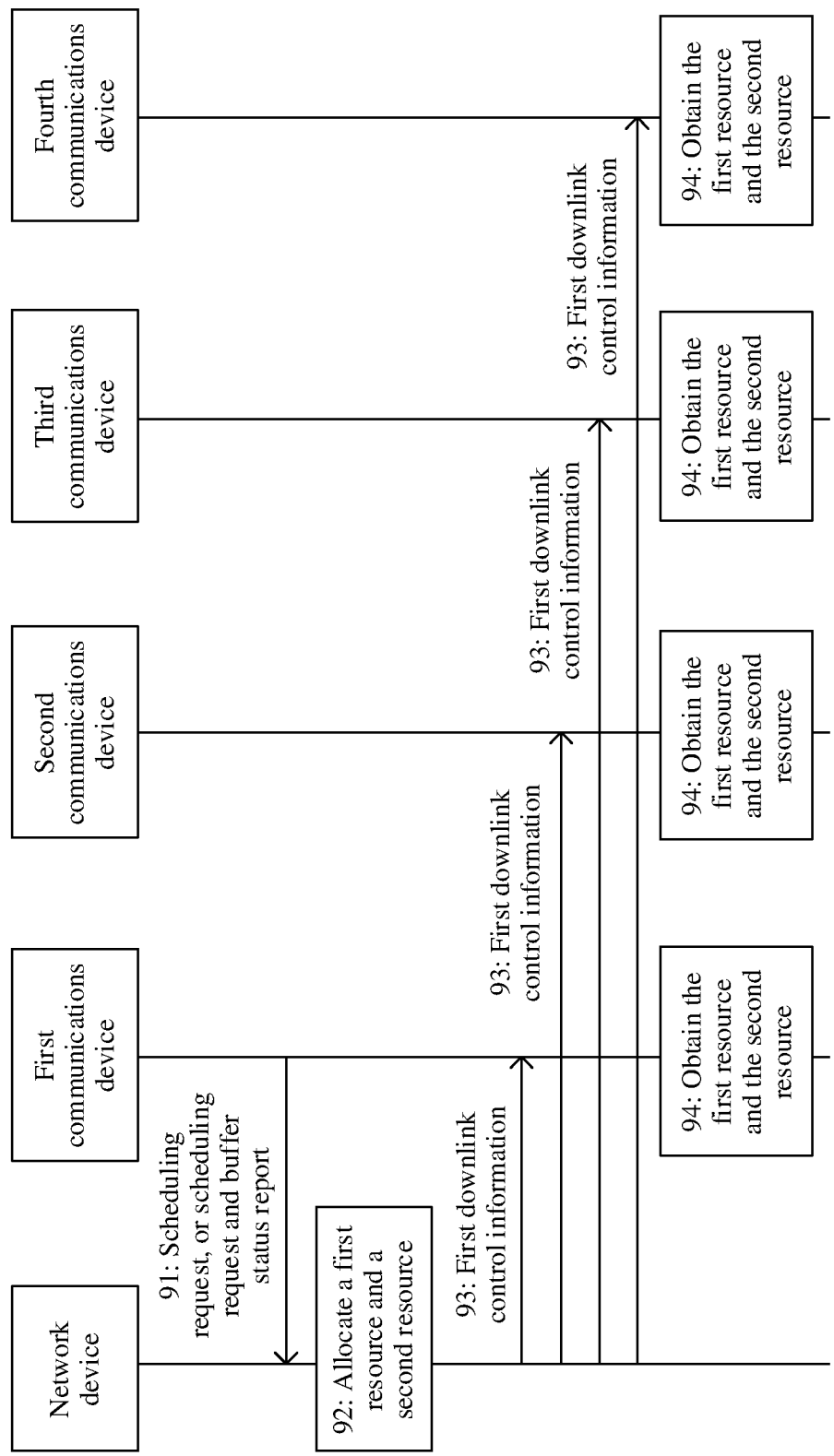
FIG. 9 is a schematic diagram of a method for obtaining a first resource and a second resource according to an embodiment of this application.

In V2X communication in network device scheduling mode, for example, in mode 3, specific steps in which the first communications device obtains the first resource and the second resource are shown in FIG. 9. Communication in network device scheduling mode 3 is V2X communication based on scheduling by a base station, and a resource used by the first communications device to send control information and data to another communications device is allocated by the base station.

In step 91 in FIG. 9, the sending unit 21 of the first communications device sends a scheduling request (SR) to the network device on a third resource. The network device allocates, to different communications device groups in a system, a resource for sending the scheduling request. Each communications device group has a resource for sending the scheduling request, and the resource corresponds to the communications device group. For example, there is a correspondence between the first communications device group and the third resource. When the receiving unit 73 of the network device receives, on the third resource, the scheduling request from the first communications device that belongs to the first communications device group, the network device may determine, based on the third resource and the correspondence between the third resource and the first communications device group, that the resource is a resource on which a communications device in the first communications device group requests to transmit the control information, the data, and/or the acknowledgement information. The group identifier of the first communications device group used to scramble first downlink control information may be obtained by the network device based on the correspondence, and the third resource may be a physical uplink control channel (PUCCH). The scheduling request is used to request the network device to schedule the first resource used to transmit the first control information and the first data and/or the second resource used to transmit the acknowledgement information. Optionally, the first communications device may notify, by sending scheduling requests of different sequences, the network device whether to allocate the second resource used to transmit the acknowledgement information. For example, when the first communications device sends a scheduling request sequence A to the network device, it indicates that the first communications device needs the network device to allocate the second resource used to transmit the acknowledgement information. In this case, the network device schedules the first resource used to transmit the first control information and the first data and the second resource used to transmit the acknowledgement information. When the first communications device sends a scheduling request sequence B to the network device, it indicates that the first communications device does not need the network device to allocate the second resource used to transmit the acknowledgement information. In this case, the network device schedules only the first resource used to transmit the first control information and the first data. The second resource may be included in a hybrid automatic repeat request grant (HARQ-Grant) sent by the base station, or may be included in a channel state information grant (CSI-Grant).

In step 91 in FIG. 9, the sending unit 21 of the first communications device can alternatively send a scheduling request and a buffer status report (BSR) to the network device. The buffer status report includes a group identifier of a first communications device group to which the first communications device belongs, the buffer status report is used to request the network device to schedule the second resource used to transmit the acknowledgement information, and the scheduling request is used to request the network device to schedule the first resource used to transmit the first control information and the first data. The first communications device may send the scheduling request and the buffer status report to the network device on a physical uplink shared channel (PUSCH). In addition to the group identifier of the first communications device group, the buffer status report may further include one-bit indication information to indicate whether the network device needs to allocate the second resource used to transmit the acknowledgement information. For example, when the one-bit indication information is 1, the network device allocates the second resource used to transmit the acknowledgement information. When the one-bit indication information is 0, the network device does not allocate the second resource used to transmit the acknowledgement information. Optionally, the buffer status report may be used to request the network device to schedule the second resource used to transmit the channel state information, or the buffer status report may be used to request the network device to schedule the second resource used to transmit the acknowledgement information and the channel state information. In other words, the second resource scheduled by the base station may be used to transmit not only the acknowledgement information, but also the channel state information, and may also be used to transmit the acknowledgement information and the channel state information.

Step 92: In response to the scheduling request sent by the first communications device or a combination of the scheduling request and the buffer status report, the processing unit 72 of the network device allocates the first resource used to transmit the first control information and the first data and the second resource used to transmit the acknowledgement information. Optionally, the second resource may be used to transmit the channel state information, or the second resource may be used to transmit the acknowledgement information and the channel state information.

Step 93: The sending unit 71 of the network device sends first downlink control information (DCI) to the first to fourth communications devices, where the first downlink control information is used to indicate the first resource and the second resource, and the first downlink control information is scrambled by using the group identifier of the first communications device group. The first downlink control information may include at least one of the following information: sidelink resource configuration information, a modulation and coding scheme (MCS) used for sidelink transmission, sidelink feedback resource configuration information, and a user equipment identifier (UE-ID) of user equipment that initiates sending of groupcast or broadcast data. The sidelink resource configuration information is used to indicate the first resource used for transmission of sidelink control information and sidelink data, the sidelink feedback resource configuration information is used to indicate the second resource used to transmit the acknowledgement information on a sidelink, and the user equipment identifier of the user equipment that initiates sending of groupcast or broadcast data is used by the first to fourth communications devices to learn of a communications device that is to initiate sending of groupcast or broadcast data on the sidelink. For example, when the first downlink control information includes the user equipment identifier of the first communications device, after receiving the first downlink control information, the first to fourth communications devices may learn that the first communications device is a communications device that is to send sidelink information, and the second to fourth communications devices are communications devices that are to receive the sidelink information. A communications device in the first communications device group that initiates sending of the groupcast or broadcast data may be set by the network device when the first communications device group is established, or may be set by the communications devices that establish the first communications device group when the first communications device group is established.

Step 94: The first to fourth communications devices obtain the first resource and the second resource. The first downlink control information sent by the network device is scrambled by using the group identifier of the first communications device group. Therefore, only a communications device that belongs to a member of the first communications device group can descramble the scrambled first downlink control information to obtain the first resource and the second resource. In other words, the first to fourth communications devices obtain the first resource and the second resource by descrambling the first downlink control information. For example, the receiving unit 23 of the first communications device receives, from the network device, the first downlink control information scrambled by using the group identifier, and the first communications device descrambles, based on the group identifier, the first downlink control information scrambled by using the group identifier, to obtain the first downlink control information, obtain the first resource used to transmit the first control information and the first data, and obtain the second resource used to transmit the acknowledgement information.

In V2X communication in user-selected mode, for example, in mode 4, specific steps in which the first communications device obtains the first resource and the second resource are shown in FIG. 4. Communication in user-selected mode is V2X communication in which a communications device independently selects a resource used to transmit control information and data. The first communications device selects the first resource and the second resource from a resource pool, and notifies, by using sidelink control information, another communications device of the first resource and the second resource that are selected by the first communications device.

Figure 10:
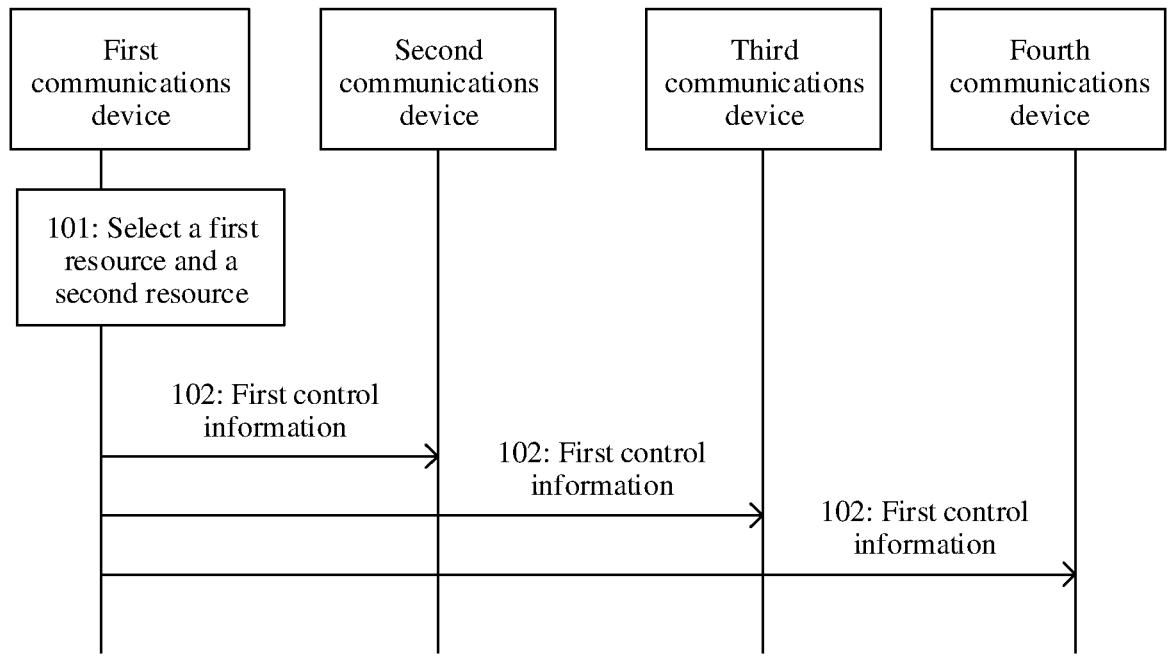
FIG. 10 is a schematic diagram of a method for selecting a first resource and a second resource according to an embodiment of this application.

In step 101 in FIG. 10, the processing unit 22 of the first communications device selects the first resource and the second resource from the resource pool. Optionally, the first communications device selects the first resource from the resource pool for the sidelink control information and sidelink data, and selects the second resource from the resource pool for the acknowledgement information. Certainly, the first communications device may alternatively select the first resource and the second resource from a common resource pool.

Step 102: The sending unit 21 of the first communications device sends a resource used to send the first data on the first resource, the second resource, and the group identifier of the first communications device group to the another communications device. Specifically, step 102 is the same as step 82.

Step 82: The sending unit 21 of the first communications device sends the first control information and the first data to at least one communications device in a group on the first resource, and a receiving unit of the at least one communications device in the group receives the first control information and the first data from the first communications device on the first resource. The at least one communications device in the group refers to a plurality of other communications devices than the first communications device that belong to the first communications device group. In FIG. 8, the at least one communications device in the group specifically includes the second to fourth communications devices. The first communications device and the at least one communications device in the group belong to the first communications device group, the first communications device and the at least one communications device in the group each have the group identifier of the first communications device group, and the first control information is used to indicate the resource used to send the first data on the first resource, the second resource, and the group identifier of the first communications device group. The first control information may be the sidelink control information (SCI).

In step 82, the sending unit 21 of the first communications device may further send the first control information and the first data to at least one communications device outside a group on the first resource, a receiving unit of the at least one communications device outside the group receives the first control information and the first data from the first communications device on the first resource, the at least one communications device outside the group does not belong to the first communications device group, and the at least one communications device outside the group does not have the group identifier of the first communications device group. The at least one communications device outside the group refers to a plurality of other communications devices that do not belong to the first communications device group. In FIG. 8, for example, the at least one communications device outside the group is the fifth communications device. In other words, the first communications device broadcasts, on the first resource, the first control information and the first data to other communications devices nearby the first communications device, and the other communications devices nearby the first communications device not only include the other communications devices than the first communications device that belong to the first communications device group but also include the communications devices that do not belong to the first communications device group. Therefore, the communications device outside the group may also receive the first data from the first communications device based on the first control information, so that reliability of a communications device outside the first communications device group can be improved. However, because the fifth communications device may be determined as a communications device outside a group based on the group identifier of the first communications device group, the fifth communications device does not need to feed back the acknowledgement information to the first communications device.

A separation between the first resource and the second resource in time domain may have a predefined time length. For example, the first resource and the second resource are separated by z slots, z mini-slots, z subframes, or z other time units. The first control information may be further used to indicate that the first resource and the second resource are separated by k slots, and when the first resource belongs to a slot n, the second resource belongs to a slot n+k or a slot n+k−1, where n is an integer, and k is a positive integer. Preferably, a reservation field or reservation information in the first control information may be used to indicate the k slots. The first control information may further include one-bit HARQ reservation indication information, which is used to indicate whether the reservation field or the reservation information in the first control information is used to indicate the second resource used to transmit the HARQ information.

Step 83: The sending units of the second to fourth communications devices send the acknowledgement information to the first communications device on the second resource, the receiving unit 23 of the first communications device receives the acknowledgement information from the second to fourth communications devices on the second resource, and the acknowledgement information is used to feed back whether the second to fourth communications devices correctly receive the first data. Optionally, the sending units of the second to fourth communications devices may send the channel state information to the first communications device on the second resource, or the sending units of the second to fourth communications devices may send the acknowledgement information and the channel state information to the first communications device on the second resource.

The second communications device is used as an example. The second communications device is at least one communications device in a group, the second communications device belongs to the first communications device group, and the second communications device has the group identifier of the first communications device group. After the second communications device receives the first control information and the first data sent by the first communications device, the second communications device determines, based on the group identifier of the first communications device group that is carried in the first control information, that the second communications device and the first communications device belong to a same communications device group, that is, belong to the first communications device group. In this case, the second communications device feeds back the acknowledgement information to the first communications device on the second resource. For example, when the second communications device correctly or successfully receives the first data, the second communications device sends ACK acknowledgement information to the first communications device. When the second communications device does not correctly or successfully receive the first data, the second communications device sends NACK acknowledgement information to the first communications device. The third communications device and the fourth communications device are also communications devices that belong to the first communications device group. Therefore, specific steps of sending the acknowledgement information by the third communications device and the fourth communications device are the same as those of sending the acknowledgement information by the second communications device, and details are not described again.

The first communications device may further send a reference signal when sending the first data to the second to fourth communications devices on the first resource, and determining units of the second to fourth communications devices may measure the reference signal and generate channel state information. In this case, the second to fourth communications devices may send the channel state information to the first communications device on the second resource. Therefore, the first communications device may obtain a sidelink channel state by using the received channel state information. The second to fourth communications devices may send the channel state information and the acknowledgement information to the first communications device on the second resource. Details are not described herein again.

The fifth communications device is used as an example. The fifth communications device is at least one communications device outside a group, the fifth communications device does not belong to the first communications device group, and the fifth communications device does not have the group identifier of the first communications device group. Therefore, after the fifth communications device receives the first control information and the first data sent by the first communications device, the fifth communications device determines, based on the group identifier of the first communications device group that is carried in the first control information, that the fifth communications device and the first communications device do not belong to a same communications device group, that is, do not belong to the first communications device group. Therefore, after the fifth communications device receives the first data sent by the first communications device, the fifth communications device does not need to feed back the acknowledgement information to the first communications device.

Groupcast feedback in the embodiment of FIG. 8 is used as an example. The first to fourth communications devices form the first communications device group. After receiving the first data sent by the first communications device, the second to fourth communications devices feed back the acknowledgement information. The acknowledgement information may be fed back in a plurality of manners.

Manner 1: The second resource is divided into several resource units in frequency domain. For example, each resource unit is one resource block (Resource Block, RB), and each RB corresponds to one communications device. The first communications device may determine, based on a location of an RB on which the acknowledgement information is received, a communications device that sends the acknowledgement information. For example, as shown in FIG. 11, the second communications device corresponds to an RB 0, the third communications device corresponds to an RB 1, and the fourth communications device corresponds to an RB 2. In this case, the acknowledgement information received by the first communications device on the RB 0 is sent by the second communications device, and so on. In this case, the first communications device may determine, based on a ratio of a quantity of received ACKs or NACKs to a total quantity of pieces of the acknowledgement information, whether to perform groupcast retransmission, that is, resend the first data to the second to fourth communications devices. Alternatively, the first communications device may determine, based on a location of an RB on which NACK acknowledgement information is received, to retransmit the first data in a unicast manner to a communications device that does not correctly or successfully receive the first data.

Manner 2: A communications device that correctly or successfully receives the first data sends ACK acknowledgement information to the first communications device, and a communications device that does not correctly or successfully receive the first data does not send any acknowledgement information to the first communications device. The first communications device does not distinguish a communications device that sends the received ACK acknowledgement information, the first communications device determines, based on a preset threshold and a ratio of a quantity of pieces of the received ACK acknowledgement information to a quantity of communications devices other than the first communications device in the first communications device group, whether to perform groupcast retransmission, that is, retransmit the first data to the second to fourth communications devices in a groupcast manner. For example, when the second communications device and the third communications device correctly or successfully receive the first data sent by the first communications device, the second communications device and the third communications device each send the ACK acknowledgement information to the first communications device on the second resource. When the fourth communications device does not correctly or successfully receive the first data sent by the first communications device, the fourth communications device does not feed back any acknowledgement information to the first communications device. Therefore, the first communications device receives two pieces of the ACK acknowledgement information in total, and there are three communications devices in total other than the first communications device in the first communications device group. Therefore, the ratio of the quantity of the pieces of the ACK acknowledgement information received by the first communications device to the quantity of the communications devices other than the first communications device in the first communications device group is 66.7%. Assuming that the preset threshold is 80%, the first communications device determines that—only 66.7%, less than the preset threshold, 80%, of the communications devices in the group correctly receive the first data. In this case, the first communications device retransmits the first data to the second to fourth communications devices in the groupcast manner. Alternatively, the first communications device may determine, based on whether a received signal strength indicator (RSSI) of received ACK acknowledgement information is greater than a preset threshold, whether to retransmit the first data to the second to fourth communications devices in the groupcast manner. For example, the RSSI of the ACK acknowledgement information received by the first communications device is greater than the preset threshold, it indicates that many communications devices in the group correctly or successfully receive the first data, and the first communications device determines that the second to fourth communications devices correctly or successfully receive the first data. Therefore, the first communications device does not retransmit the first data to the second to fourth communications devices in the groupcast manner. If the RSSI of the ACK acknowledgement information received by the first communications device is less than the preset threshold, the first communications device retransmits the first data to the second to fourth communications devices in the groupcast manner.

Manner 3: A communications device that does not correctly or successfully receive the first data sends NACK acknowledgement information to the first communications device, and a communications device that correctly or successfully receives the first data does not send any acknowledgement information to the first communications device. The first communications device does not distinguish a communications device that sends the received NACK acknowledgement information, the first communications device determines, based on a preset threshold and a ratio of a quantity of pieces of the received NACK acknowledgement information to a quantity of communications devices other than the first communications device in the first communications device group, whether to perform groupcast retransmission, that is, retransmit the first data to the second to fourth communications devices in a groupcast manner. For example, when the second communications device and the third communications device do not correctly or successfully receive the first data sent by the first communications device, the second communications device and the third communications device each send the NACK acknowledgement information to the first communications device on the second resource. When the fourth communications device correctly or successfully receives the first data sent by the first communications device, the fourth communications device does not feed back any acknowledgement information to the first communications device. Therefore, the first communications device receives two pieces of the NACK acknowledgement information in total, and there are three communications devices in total other than the first communications device in the first communications device group. Therefore, the ratio of the quantity of the pieces of the NACK acknowledgement information received by the first communications device to the quantity of the communications devices other than the first communications device in the first communications device group is 66.7%. Assuming that the preset threshold is 30%, the first communications device determines that as high as 66.7%, greater than the preset threshold, 30%, of the communications devices in the group do not correctly or successfully receive the first data. In this case, the first communications device retransmits the first data to the second to fourth communications devices in the groupcast manner. Alternatively, the first communications device may determine, based on whether an RSSI of received NACK acknowledgement information is greater than a preset threshold, whether to retransmit the first data to the second to fourth communications devices in the groupcast manner. For example, the RSSI of the NACK acknowledgement information received by the first communications device is greater than the preset threshold, it indicates that many communications devices in the group do not correctly or successfully receive the first data, and the first communications device determines that the second to fourth communications devices do not correctly or successfully receive the first data. Therefore, the first communications device retransmits the first data to the second to fourth communications devices. If the RSSI of the NACK acknowledgement information received by the first communications device is less than the preset threshold, the first communications device does not retransmit the first data to the second to fourth communications devices in the groupcast manner.

According to the embodiments of this application, the first communications device obtains the first resource and the second resource, sends the first control information and the first data to the second communications device on the first resource, and receives the acknowledgement information from the second communications device on the second resource. Therefore, reliability of V2X communication is improved.

In the several embodiments provided in this application, it should be understood that the disclosed system, apparatus, and method may be implemented in another manner. For example, the described apparatus embodiments are merely examples. For example, division into the unit is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A method, comprising:
   obtaining, by a first communications device, a first resource and a second resource;
   sending, by the first communications device, first control information and first data to a second communications device and a third communications device on the first resource, wherein the first communications device, the second communications device, and the third communications device belong to a first communications device group, the first communications device, the second communications device, and the third communications device each have a group identifier of the first communications device group, and the first control information indicates the first resource, the second resource, and the group identifier of the first communications device group;
   receiving, by the first communications device, first acknowledgement information from the second communications device on the second resource, wherein the first acknowledgement information feeds back whether the second communications device correctly received the first data; and receiving, by the first communications device, second acknowledgement information from the third communications device on the second resource, wherein the second acknowledgement information feeds back whether the third communications device correctly received the first data.

2. The method according to claim 1, further comprising:
receiving, by the first communications device, first downlink control information from a network device, wherein the first downlink control information indicates the first resource and the second resource, and the first downlink control information is scrambled using the group identifier of the first communications device group; and
obtaining, by the first communications device, the first resource and the second resource comprises:
obtaining, by the first communications device, the first resource and the second resource by descrambling the first downlink control information.

3. The method according to claim 2, wherein before receiving, by the first communications device, the first downlink control information from the network device, the method further comprises:
sending, by the first communications device, a scheduling request to the network device on a third resource, wherein there is a correspondence between the third resource and the first communications device group, and the scheduling request requests the network device to schedule the first resource and the second resource; and
wherein the group identifier of the first communications device group is obtained by the network device based on the correspondence.

4. The method according to claim 2, further comprising:
sending, by the first communications device, a buffer status report and a scheduling request to the network device, wherein the buffer status report comprises the group identifier of the first communications device group to which the first communications device belongs, the buffer status report requests the network device to schedule the second resource, and the scheduling request requests the network device to schedule the first resource.

5. The method according to claim 1, wherein obtaining, by the first communications device, the first resource and the second resource comprises:
selecting, by the first communications device, the first resource and the second resource from a resource pool.

6. The method according to claim 1, wherein the first control information further indicates that the first resource and the second resource are separated by k slots, and when the first resource belongs to a slot n, the second resource belongs to a slot n+k or a slot n+k−1, wherein n is an integer, and k is a positive integer.

7. The method according to claim 1, wherein sending, by the first communications device, the first control information and the first data to the second communications device and the third communications device on the first resource comprises:
sending, by the first communications device, the first control information and the first data to the second communications device and the third communications device on the first resource in a groupcast manner.

8. The method according to claim 1, wherein sending, by the first communications device, the first control information and the first data to the second communications device and the third communications device on the first resource comprises:
sending, by the first communications device, the first control information and the first data to the second communications device and the third communications device on the first resource in a broadcast manner.

9. A first communications device, comprising:
a transmitter;
a receiver;
a processor; and
a non-transitory computer-readable storage medium storing a program to be executed by the processor, the program including instructions for:
sending, using the transmitter, a scheduling request to a network device on a third resource, wherein there is a correspondence between the third resource and a first communications device group, and the scheduling request requests the network device to schedule a first resource and a second resource, and a group identifier of the first communications device group is obtained by the network device based on the correspondence;
receiving, using the receiver, first downlink control information from the network device, wherein the first downlink control information indicates the first resource and the second resource, and the first downlink control information is scrambled using the group identifier of the first communications device group;
obtaining the first resource and the second resource by descrambling the first downlink control information;
sending, using the transmitter, first control information and first data to a second communications device on the first resource, wherein the first communications device and the second communications device belong to the first communications device group, the first communications device and the second communications device each have the group identifier of the first communications device group, and the first control information indicates a the first resource, the second resource, and the group identifier of the first communications device group; and
receiving, using the receiver, first acknowledgement information from the second communications device on the second resource, wherein the first acknowledgement information feeds back whether the second communications device correctly received the first data.

10. The first communications device according to claim 9, wherein the program further includes instructions for:
sending the first control information and the first data to a third communications device on the first resource, wherein the third communications device does not belong to the first communications device group, and the third communications device does not have the group identifier of the first communications device group.

11. The first communications device according to claim 9, wherein the first control information further indicates that the first resource and the second resource are separated by k slots, and when the first resource belongs to a slot n, the second resource belongs to a slot n+k or a slot n+k−1, wherein n is an integer, and k is a positive integer.

12. The first communications device according to claim 9, wherein the program further includes instructions for:
sending the first control information and the first data to a third communications device on the first resource, wherein the third communications device belongs to the first communications device group, and the third communications device has the group identifier of the first communications device group; and receiving second acknowledgement information from the third communications device on the second resource, wherein the second acknowledgement information feeds back whether the third communications device correctly received the first data.

13. The first communications device according to claim 9, wherein sending, using the transmitter, the first control information and the first data to the second communications device on the first resource comprises:

sending, using the transmitter, the first control information and the first data to the second communications device on the first resource in a groupcast manner.

14. The first communications device according to claim 9, wherein sending, using the transmitter, the first control information and the first data to the second communications device on the first resource comprises:

sending, using the transmitter, the first control information and the first data to the second communications device on the first resource in a broadcast manner.

15. A second communications device, comprising:
a transmitter;
a receiver;
a processor; and
a non-transitory computer-readable storage medium storing a program to be executed by the processor, the program including instructions for:
receiving, using the receiver, first control information and first data from a first communications device on a first resource, wherein the first communications device, the second communications device, and a third communications device belong to a first communications device group, the first communications device, the second communications device, and a third communications device each have a group identifier of the first communications device group, and the first control information indicates the first resource, a second resource, and the group identifier of the first communications device group; and sending, using the transmitter, first acknowledgement information to the first communications device on the second resource, wherein the first acknowledgement information feeds back whether the second communications device correctly received the first data, and wherein the third communications device sends second acknowledgment information to the first communications device on the second resource, and the second acknowledgment information feeds back whether the third communications device correctly received the first data.

16. The second communications device according to claim 15, wherein the program further includes instructions for:

receiving first downlink control information from a network device, wherein the first downlink control information indicates the first resource and the second resource, and the first downlink control information is scrambled using the group identifier of the first communications device group; and obtaining the first resource and the second resource by descrambling the first downlink control information.

17. The second communications device according to claim 15, wherein receiving, using the receiver, the first control information and the first data from the first communications device on the first resource, comprises:

receiving, using the receiver, the first control information and the first data from the first communications device that is sent on the first resource in a groupcast manner.

18. The second communications device according to claim 15, wherein receiving, using the receiver, the first control information and the first data from the first communications device on the first resource, comprises:

receiving, using the receiver, the first control information and the first data from the first communications device that is sent on the first resource in a groupcast manner.

* * * * *